United States Patent
Persoon

(10) Patent No.: US 7,054,541 B2
(45) Date of Patent: May 30, 2006

(54) EDITING OF DIGITAL VIDEO INFORMATION SIGNALS

(75) Inventor: Eric H. J. Persoon, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 19 days.

(21) Appl. No.: 09/790,598

(22) Filed: Feb. 22, 2001

(65) Prior Publication Data

US 2001/0028783 A1 Oct. 11, 2001

Related U.S. Application Data

(63) Continuation of application No. 09/352,098, filed on Jul. 14, 1999, now Pat. No. 6,263,149.

(30) Foreign Application Priority Data

Jul. 14, 1998 (EP) .............................. 98202356

(51) Int. Cl.
*H04N 5/76* (2006.01)

(52) U.S. Cl. .......................... 386/52; 386/64

(58) Field of Classification Search .................. 386/4, 386/52, 55, 64, 111–112, 33; 345/723, 724, 345/725, 726; 360/13; 369/83; H04N 5/76, H04N 9/79, 5/92, 5/781
See application file for complete search history.

(56) References Cited

U.S. PATENT DOCUMENTS

| | | | | |
|---|---|---|---|---|
| 5,202,961 A | * | 4/1993 | Mills et al. .................. 395/159 |
| 5,237,648 A | * | 8/1993 | Mills et al. .................. 395/133 |
| 5,359,712 A | * | 10/1994 | Cohen et al. ................ 395/161 |
| 5,519,828 A | * | 5/1996 | Rayner ........................ 395/161 |
| 5,732,184 A | * | 3/1998 | Chao et al. .................... 386/55 |
| 5,740,305 A | * | 4/1998 | Murakami .................... 386/52 |
| 5,760,767 A | * | 6/1998 | Shore et al. ................. 345/328 |
| 5,822,024 A | * | 10/1998 | Setogawa et al. ........... 348/845 |
| 5,835,662 A | * | 11/1998 | Inoue et al. ................... 386/52 |
| 5,877,781 A | * | 3/1999 | Tomizawa et al. .......... 345/521 |
| 5,895,121 A | * | 4/1999 | Grey et al. .................... 386/52 |
| 5,905,841 A | * | 5/1999 | Peters et al. .................. 386/52 |
| 5,911,030 A | * | 6/1999 | Kikuchi et al. ............... 386/55 |
| 5,913,013 A | * | 6/1999 | Abecassis .................... 386/125 |
| 5,995,470 A | * | 11/1999 | Tsubaki et al. ............... 369/83 |
| 6,263,149 B1 | * | 7/2001 | Persoon ........................ 386/52 |
| 6,806,909 B1 | | 10/2004 | Radha et al. |
| 6,952,521 B1 | | 10/2005 | Kelly et al. |

OTHER PUBLICATIONS

U.S. Appl. No. 10/856,227, Radha.
U.S. Appl. No. 11/237,370, Kelly.

* cited by examiner

*Primary Examiner*—Thai Tran
(74) *Attorney, Agent, or Firm*—Michael E. Belk

(57) ABSTRACT

The invention relates to editing of video information signals recorded on a record carrier, such as an optical record carrier are edited in an internal memory of the edit apparatus. Editing results in an edited stream of information, which includes a bridging fragment. Prior to recording the bridging fragment on the record carrier, the edited stream of video information around the edit point is made visible by retrieving the edited stream of video information directly from the internal memory, so as shorten the time required to make the edited stream of information visible on a display screen.

17 Claims, 4 Drawing Sheets

EDITING OF DIGITAL VIDEO INFORMATION SIGNALS

CROSS REFERENCE TO RELATED APPLICATIONS

This is a continuation of application Ser. No. 09/352,098, filed Jul. 14, 1999, now U.S. Pat. No. 6,263,149.

FIELD OF THE INVENTION

The invention relates to the field of editing first and second digital video information signal in an edit apparatus, where the second video information signal may be the same video information signal as the first video information signal, the first and second digital video information signal being recorded on a record carrier, such as an optical disc.

BACKGROUND OF THE INVENTION

Those skilled in the art are directed to U.S. patent application Ser. No. 09/226,329, filed Mar. 11, 1999 by the same applicant and hereby incorporated herein in whole by reference. That patent application describes how to edit two digital video information signals that are recorded on a record carrier, such as an optical disc. The video information signals are recorded on the record carrier in the form of blocks of information, called fragments, having a size of 4 MB, as an example. The invention aims at improving the editing method, such that the results of editing become visually available, more quickly.

SUMMARY OF THE INVENTION

The method in accordance with the invention comprises the steps of editing a first and a second digital video information signal in an edit apparatus, where the second video information signal may be the same video information signal as the first video information signal, the first and second digital video information signal being recorded on a record carrier, such as an optical disc, the method comprising the steps of (a) reading a first block of information of the first digital information signal that is located around an edit point to be determined in the first digital information signal from the record carrier into an internal memory of the apparatus, (b) outputting the first block of information from the apparatus, for display, (c) establishing an 'out' position in the first block of information as the edit point in the first digital video information signal, (d) reading a second block of information of the second digital video information signal that is located around an edit point to be determined in the second digital video information signal from the record carrier into the internal memory of the apparatus, (e) outputting the second block of information of the second digital video information signal from the apparatus, for display, (f) establishing an 'in' position in the second block of information as the edit point in the second digital video information signal, (g) processing a portion of the first block of information that precedes and may include the 'out' position, and a portion of the second block of information that follows and may include the 'in' position into a composite block of information, (h) outputting the composite block of information from the apparatus, for display, prior to (i) recording at least a portion of the composite block of information on the record carrier. More specifically, the step (g) includes the substeps of (g1) determining an exit point earlier in the first block of information than the 'out' position, (g2) determining an entry point later in the second block of information than the 'in' position, (g3) creating a bridging block of information from the information in the first block of information between the exit point and the 'out' position and from the information in the second block of information between the 'in' position and the entry point, the composite block of information comprising a portion of the first block of information that directly precedes the exit point, the bridging block of information and a portion of the second block of information that directly follows the entry point.

The invention is based on the following recognition. The above identified patent application describes how editing is performed. More specifically, edit points in the first and second digital video information signals are established, those edit points identifying the positions in the first digital information signal where the first digital information signal is left (the so called 'out' position) and where the second digital video information signal is entered (the so-called 'in' position). A bridging fragment is created to cover the jump from an earlier exit point (earlier than the 'out' position) in the first video information signal to a later entry point (later than the 'in' position) in the second video information signal, and the bridging fragment is recorded on the record carrier. Thereafter, reproduction of the edited video information signal from the record carrier can be carried out to investigate the result of the edit step. The processing and the subsequent recording of the bridging fragment requires a sufficient amount of time, so that the result of the edit operation cannot be directly checked. In accordance with the invention, the display of the edited video signal is enabled, directly from the internal memory, that is, prior to recording the bridging block of information on the record carrier, by retrieving the bridging fragment and eventually earlier information from the first video information signal and later information from the second video information signal, from the internal memory.

These and other aspects of the invention will be apparent from and elucidated with reference to the embodiments hereafter in the figure description, in which

BRIEF DESCRIPTION OF THE DRAWINGS

FIG. 1 shows an embodiment of the apparatus in accordance with the invention. In the the following figure description, the attention will mainly be focussed on editing, but prior to discussing editing, the recording and reproduction of a video information signal will be described. It should however be noted that other types of signal could equally well be processed, such as audio signals, or data signals.

DESCRIPTION OF THE PREFERRED EMBODIMENTS

The apparatus comprises an input terminal 1 for receiving a video information signal to be recorded on the disc like record carrier 3. Further, the apparatus comprises an output terminal 2 for supplying a video information signal reproduced from the record carrier 3. The record carrier 3 is a disc like record carrier of the magnetic or optical form.

The data area of the disc like record carrier 3 consists of a contiguous range of physical sectors, having corresponding sector addresses. This address space is divided into fragment areas. A fragment area is a contiguous sequence of sectors, with a fixed length. Preferably, this length corresponds to an integer number of ECC-blocks included in the video information signal to be recorded.

Figure 1:
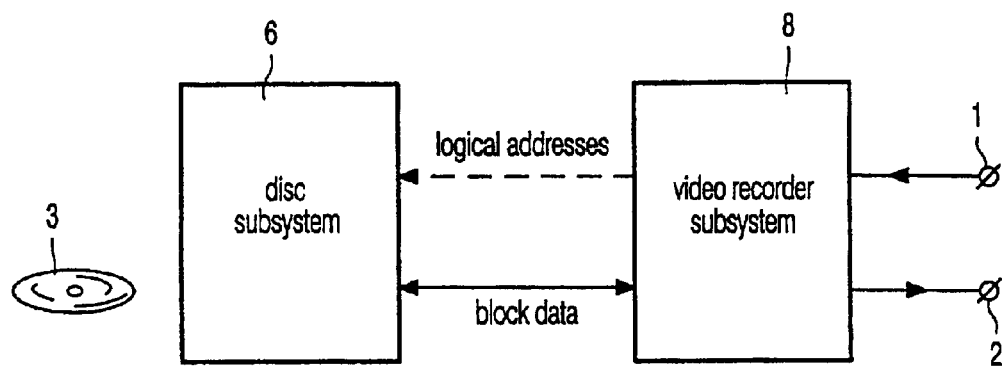
FIG. 1 shows an embodiment of the apparatus.

The apparatus shown in FIG. 1 is shown decomposited into two major system parts, namely the disc subsystem 6 and the what is called 'video recorder subsystem' 8. The two subsystems are characterized by the following features:

The disc subsystem can be addressed transparently in terms of logical addresses. It handles defect management (involving the mapping of logical addresses onto physical addresses) autonomously.

For real-time data, the disc subsystem is addressed on a fragment-related basis. For data addressed in this manner the disc subsystem can guarantee a maximum sustainable bitrate for reading and/or writing. In the case of simultaneous reading and writing, the disc subsystem handles the read/write scheduling and the associated buffering of stream data from the independent read and write channels.

The video recorder subsystem takes care of the video application, as well as file system management. Hence, the disc subsystem does not interpret any of the data that is recorded in the data area of the disc.

In order to realize real time reproduction in all situations, the fragment areas introduced earlier need to have a specific size. Also in a situation where simultaneous recording and reproduction takes place, reproduction should be uninterrupted. In the present example, the fragment size is chosen to satisfy the following requirement:

$$\text{fragment size} = 4 \text{ MB} = 2^{22} \text{ bytes}$$

Figure 2:
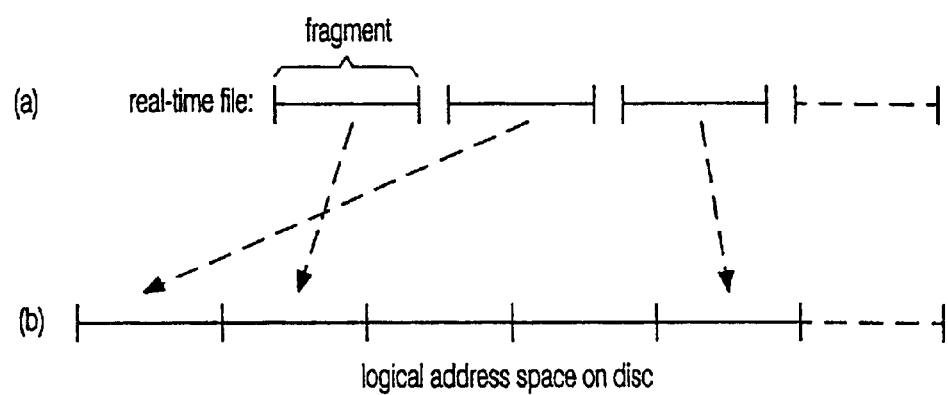
FIG. 2 shows the recording of blocks of information in fragment areas on the record carrier.

Recording of a video information signal will briefly be discussed hereafter, with reference to FIG. 2. In the video recorder subsystem, the video information signal, which is a real time signal, is converted into a real time file, as shown in FIG. 2a. A real-time file consists of a sequence of signal blocks of information recorded in corresponding fragment areas. There is no constraint on the location of the fragment areas on the disc and, hence, any two consecutive fragment areas comprising portions of information of the information signal recorded may be anywhere in the logical address space, as shown in FIG. 2b. Within each fragment area, real-time data is allocated contiguously. Each real-time file represents a single AV stream. The data of the AV stream is obtained by concatenating the fragment data in the order of the file sequence.

Figure 3:
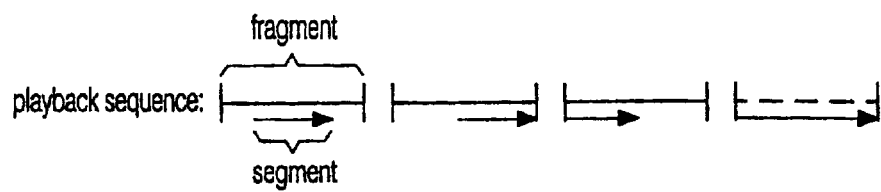
FIG. 3 shows the principle of playback of a video information signal.

Next, playback of a video information signal recorded on the record carrier will be briefly discussed hereafter, with reference to FIG. 3. Playback of a video information signal recorded on the record carrier is controlled by means of a what is called 'playback-control-program' (PBC program). In general, each PBC program defines a (new) playback sequence. This is a sequence of fragment areas with, for each fragment area, a specification of a data segment that has to be read from that fragment. Reference is made in this respect to FIG. 3, where playback is shown of only a portion of the first three fragment areas in the sequence of fragment areas in FIG. 3. A segment may be a complete fragment area, but in general it will be just a part of the fragment area. (The latter usually occurs around the transition from some part of an original recording to the next part of the same or another recording, as a result of editing.)

Note, that simple linear playback of an original recording can be considered as a special case of a PBC program: in this case the playback sequence is defined as the sequence of fragment areas in the real-time file, where each segment is a complete fragment area except, probably, for the segment in the last fragment area of the file. For the fragment areas in a playback sequence, there is no constraint on the location of the fragment areas and, hence, any two consecutive fragment areas may be anywhere in the logical address space.

Figure 4:
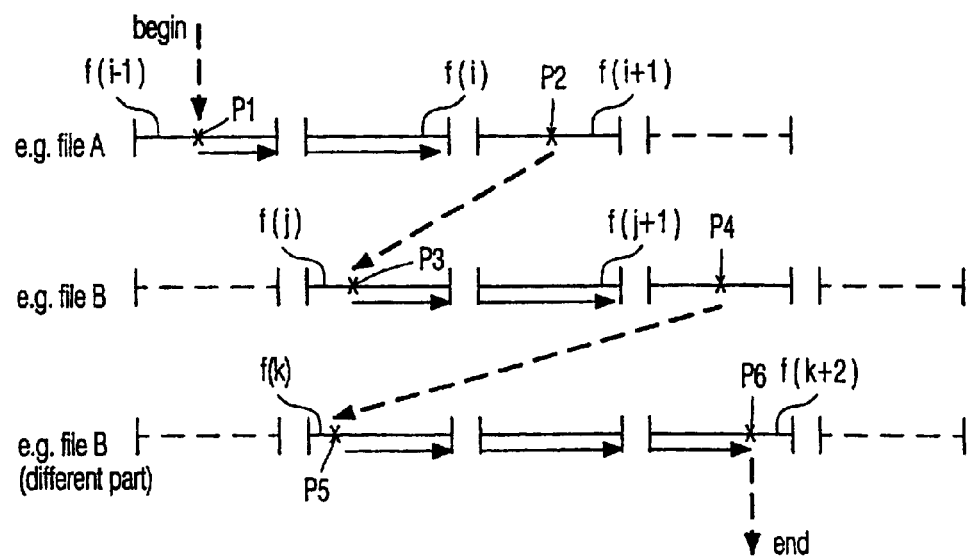
FIG. 4 shows the principle of editing of video information signals.

Next, editing of one or more video information signals recorded on the record carrier will be briefly discussed hereafter, with reference to FIG. 4. FIG. 4 shows two video information signals recorded earlier on the record carrier 3, indicated by two sequences of fragments named 'file A' and 'file B'. For realizing an edited version of one or more video information signals recorded earlier, a new PBC program should be realized for defining the edited AV sequence. This new PBC program thus defines a new AV sequence obtained by concatenating parts from earlier AV recordings in a new order. The parts may be from the same recording or from different recordings. In order to play back a PBC program, data from various parts of (one or more) real-time files has to be delivered to a decoder. This implies a new data stream that is obtained by concatenating parts of the streams represented by each real-time file. In the FIG. 4, this is illustrated for a PBC program that uses three parts, one from the file A and two from the file B.

FIG. 4 shows that the edited version starts at a point $P_1$ in the fragment area f(i−1) in the sequence of fragment areas of figure A and continues until point $P_2$ in the fragment area f(i+1) of file A. Then reproduction jumps over to the point $P_3$ in the fragment area f(j) in file B and continues until point $P_4$ in fragment area f(j+2) in file B. Next reproduction jumps over to the point $P_5$ in the same file B, which may be a point earlier in the sequence of fragment areas of file B than the point $P_3$, or a point later in the sequence than the point $P_4$.

Next, a condition for seamless playback will be discussed. One simple condition for this purpose is the constraint on the length of the data segments that occur in the playback sequences. In order to guarantee seamless play of a PBC program, the playback sequence defined by the PBC program shall be such that the segment length in all fragments (except the first and the last fragment area) shall satisfy:

$$2 \text{ MB} \leq \text{segment length} \leq 4 \text{ MB}$$

For a further explanation of this requirement, reference is made to the earlier filed U.S. patent application Ser. No. 09/226,329. The use of fragment areas allows one to consider worst-case performance requirements in terms of fragment areas and segments (the signal blocks stored in the fragment areas) only, as will be described hereafter. This is based on the fact that single logical fragments areas, and hence data segments within fragment areas, are guaranteed to be physically contiguous on the disc, even after remapping because of defects. Between fragment areas, however, there is no such guarantee: logically consecutive fragment areas may be arbitrarily far away on the disc. As a result of this, the analysis of performance requirements concentrates on the following:

a. For playback, a data stream is considered that is read from a sequence of segments on the disc. Each segment is contiguous and has an arbitrary length between 2 MB and 4 MB, but the segments have arbitrary locations on the disc.

b. For recording, a data stream is considered that is to be written into a sequence of 4 MB fragment areas on the disc. The fragment areas have arbitrary locations on the disc.

Note that for playback, the segment length is flexible. For record, however, complete fragment areas with fixed length are written.

Figure 6:
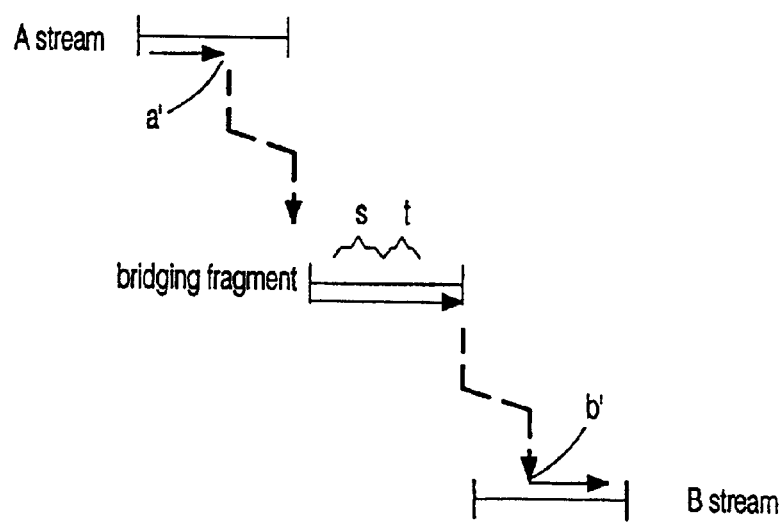
FIG. 6 shows an example of the editing of two information signals and the generation of a bridging block of information.

Next, editing will be further described. Creating a new PBC program or editing an existing PBC program, generally results in a new playback sequence. It is the objective to guarantee that the result is seamlessly playable under all circumstances, even during simultaneous recording. A series of examples will be discussed, where it is assumed that the intention of the user is to make a new AV stream out of one or two existing AV streams. The examples will be discussed in terms of two streams A and B, where the intention of the user is to make a transition from A to B. This is illustrated in FIG. 6, where a is the intended exit point from stream A and where b is the intended entry point into stream B.

Figure 5A:
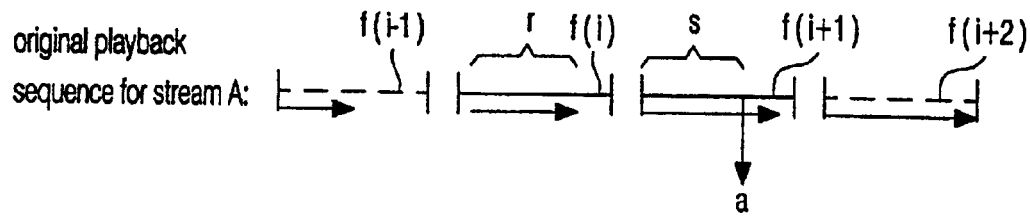
FIGS. 5a–5b show a situation during editing.
Figure 5B:
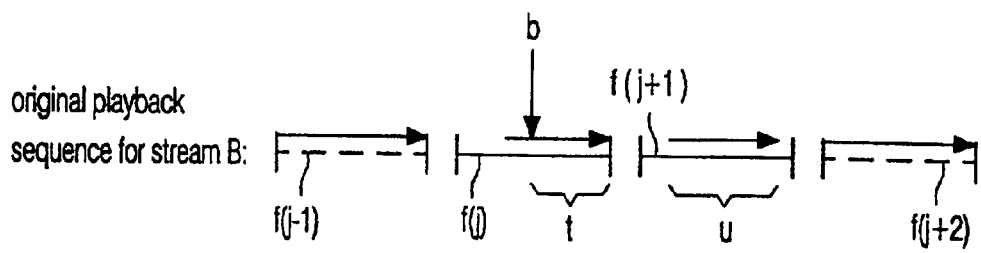

FIG. 5*a* shows the sequence of fragment areas . . . , f(i−1), f(i), f(i+1), f(i+2), . . . of the stream A and FIG. 5*b* shows the sequence of fragment areas . . . , f(−1), f(j), f(j+1), f(j+2), . . . of the stream B. The edited video information signal consists of the portion of the stream A preceding the exit point a in fragment area f(i+1), and the portion of the stream B starting from the entry point b in fragment area f(j).

This is a general case that covers all cut-and-paste-like editing, including appending two streams etc. It also covers the special case where A and B are equal. Depending on the relative position of a and b, this special case corresponds to PBC effects like skipping part of a stream or repeating part of a stream.

The discussion of the examples given in the earlier filed European patent application focuses on achieving seamless playability of the edited stream. The condition for seamless playability is the segment length condition on the length of the signal blocks of information stored in the fragment areas, that was discussed earlier. It is shown in the earlier filed European patent application that, if streams A and B satisfy the segment length condition, then a new stream can be defined such that it also satisfies the segment length condition. Thus, seamlessly playable streams can be edited into new seamlessly playable streams. Since original recordings are seamlessly playable by construction, this implies that any edited stream will be seamlessly playable. As a result, arbitrarily editing earlier edited streams is also possible. Therefore streams A and B in the discussion need not be original recordings: they can be arbitrary results of earlier virtual editing steps.

The discussion of various examples in the earlier filed European patent application results in the conclusion that a seamlessly playable sequence can be defined under all circumstances, by creating at most two bridging fragments. It can even be shown that, in fact, one bridging fragment area is sufficient. This is shown in FIG. 6, where, when s and t are both very short, they are both copied into a single bridging fragment area (and, if necessary, some preceding data from stream A and/or some succeeding data from stream B).

In FIGS. 5*a* and 5*b*, the point a in the stream A is defined as the 'out' position, where a editor decides where the jump from the signal A to the signal B should start and the point b in the stream B is defined as the 'in' position, where the editor decides where the jump from the A signal should enter into the B signal. For reasons extensively described in the earlier filed European patent application, the position a' in FIG. 6 generally lies ahead of the position a in the stream A and the position b' generally lies behind the position b in the stream B. In the example of FIG. 10, the portion s of the fragment f(i+1) and the portions of the fragment f(j) are included in the bridging fragment, so that the position a' will lie in the fragment f(i) and the position b' will lie in the fragment f(j+1).

Figure 7:
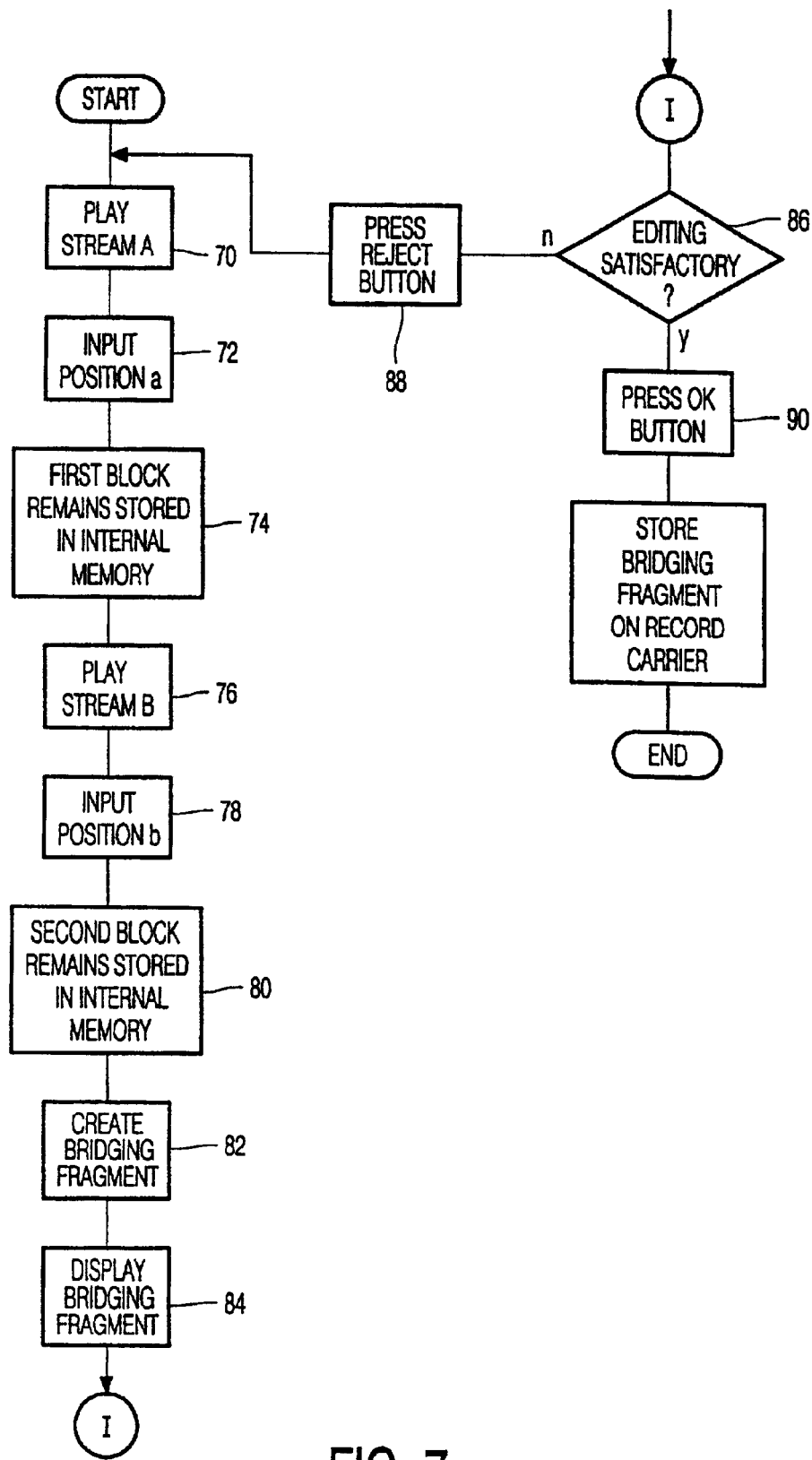
FIG. 7 shows a flow diagram of the editing process.

The method of editing will now further described hereafter with reference to FIG. 7. The editor starts reproducing the stream A, see block 70. This is realized by reading the fragments from the record carrier, storing them in an internal memory of the edit apparatus, carrying out a decoding process on the information comprised in the fragments and outputting the decoded video information for display on a TV display tube. The reproduction of the stream A is continued until the editor establishes the 'out' location (the position a), from where the jump to the stream B should start, see block 72. This is done by pressing some button on the edit apparatus, in response to which pressing, information relating to the position a in the stream A is stored in the edit apparatus. Further, a portion of information around the point a, in any way the portion of the stream A directly preceding the position a, remains stored in the internal memory of the edit apparatus, see block 74. Next, the editor instructs the edit apparatus to reproduce the stream B, see block 76. This is, again, realized by reading the fragments from the record carrier, storing them in the internal memory of the edit apparatus, carrying out a decoding process on the information comprised in the fragments and outputting the decoded video information for display on a TV display tube. The reproduction of the stream B is continued until the editor establishes the 'in' location (the position b), to which point into the stream B the edit jump should go, see block 78. This is done by pressing the above introduced button on the edit apparatus, in response to which pressing, information relating to the position b in the stream B is stored in the edit apparatus. Further, a portion of information around the point b, in any way the portion of the stream B directly following the position b, remains stored in the internal memory of the edit apparatus, see block 80. It should thus be noted that the internal memory now comprises a portion of information of the stream A and a portion of information of the stream B. The portion of information of the stream A stored in the internal memory can include the portion s of the fragment f(i+1) or the complete fragment f(i+1) and eventually the preceding fragment f(i). The portion of information of the stream B stored in the internal memory can include the portion t of the fragment f(j) or the complete fragment f(j) and eventually the following fragment f(j+1).

Next, the editing apparatus generates the bridging fragment, see block 82, by carrying out a process as described in the earlier filed U.S. patent application Ser. No. 09/226,329, resulting to the creation of a bridging fragment that is stored in the internal memory as well. This may lead to the bridging fragment shown in FIG. 6, and new exit and entry points a' and b'. Subsequent thereto, the edited stream around the edit point is displayed, by outputting the bridging fragment from the internal memory, see block 84. The display may be extended to the portion of the A stream directly preceding the exit point a', and also stored in the internal memory, and to the portion of the B stream directly following the entry point b', and also stored in the internal memory.

The editor can decide on whether he is satisfied with the edit process carried out, or not, see block 86. When not satisfied, he presses a reject button, see block 88. In response to pressing the reject button, the apparatus again starts playing the A stream, so as to enable the editor to enter new 'out' and 'in' positions, where necessary. When satisfied, the editor presses an OK button, see block 90. In response to pressing the OK button, the apparatus stores the bridging fragment on the record carrier, including information concerning the exit and entry points, so that reproduction of the edited stream is possible at a later time.

The internal memory for carrying out the edit step is comprised in the block 8 of the apparatus of FIG. 1.

Generally stated, what is proposed here, is to load blocks of information around the edit points of both stream in the internal memory of the apparatus. Assume the memory is 128 Mbits (16 Mbyte) and assume that during editing no other functions are active in the apparatus, then the full 16 Mbyte can be used to load a block of information of a size of e.g. 8 Mbyte that includes the exit point and block of information of e.g. 8 Mbyte that includes the entry point.

The editor can, if necessary, first indicate an approximate position for both the OUT and IN point by pressing a button while watching the original streams. Then part of the first information block (with the OUT point) should be (or remain) loaded in the internal memory but loading sufficient information after the OUT point also in the internal memory. Next part of the second information block should be (or remain) loaded in the internal memory, preferably including sufficient information before the IN point also in memory. In this way the editor can "refine the IN and OUT points" without having to reload new information of the disc into memory.

Having 16 Mbytes available at 10 Mbps peak bit rate, and allowing for an overlap in time of 2 seconds of both signal blocks, a total resulting playing time from memory can be achieved of 14 seconds.

A further aspect of the invention, is the generation of the bridging fragment 'in the background', after having inputted the 'out' and 'in' positions a and b respectively, see FIG. 5, for a first edit point. As a result, after having inputted the 'out' and 'in' positions for the first editing point, the user can start finding the exact positions of the next 'out' and 'in' positions for the next edit point, whilst the system generates the bridging fragment for the first edit point 'in the background'. In this way, time required for editing can be decreased, by doing tasks in parallel in the foreground and the background.

With the invention, seamless playback is possible using only one MPEG decoder.

Whilst the invention has been described with reference to preferred embodiments thereof, it is to be understood that these are not limitative examples. Thus, various modifications may become apparent to those skilled in the art, without departing from the scope of the invention, as defined by the claims. Further, the invention lies in each and every novel feature or combination of features.

What is claimed is:

1. A method of editing a first and a second digital video information signal hi an edit apparatus, the first and second digital video information signals being the seine signal or different signals, the first and second digital video information signals being recorded on the same or different record carriers, the method comprising:

first reading a first block of information of the first digital information signal that is located around an edit point to be determined in the first digital information signal from the record carrier into an internal memory of the apparatus, wherein size of the first block of information is within a predetermined range, first outputting the first block of information from the apparatus, for display, first establishing an "out" position in the first block of information as the edit point in the first digital video information signal, second reading a second block of information of the second digital video information signal that is located around an edit point to be determined in the second digital video information signal from the record carrier into the internal memory of the apparatus, wherein size of the second block of information is within die predetermined range, second outputting the second block of information of the second digital video information signal from tho apparatus, for display, second establishing an "in" position in the second block of information as the edit point in the second digital video information signal, processing a portion of the first block of information that precedes and may include the "out" position, and a portion of the second block of information that follows and may include the "in" position into a composite block of information, such that a resulting size of the composite block of information is within the predetermined range, third outputting die composite block of information from the apparatus, for display, recording at least a portion of the composite block of information on the record carrier after the outputting for display.

2. The method of claim 1, wherein the recording further includes manually inputting a recording control signal after the outputting of the composite block of information for display, the recording including recording the at least a portion of the composite block of information stored in the internal memory onto the record carrier in response to the recording control signal.

3. The method of claim 1, wherein the recording further includes manually inputting a reject control signal after the outputting of the composite block of information for display, the method further comprising repeating at least the first establishing, the second establishing, the processing, and the third outputting in response to the reject control signal.

4. The method of claim 1, wherein the processing includes:

determining an exit point earlier in the first block of information than the "out" position, determining an entry point later in the second block of information than the "in" position, creating a bridging block of information from the information in the first block of information between the exit point and the "out" position and from the information in the second block of information between the "in" position and the entry point, the composite block of information comprising a portion of the first block of information that directly precedes the exit point, the bridging block of information and a portion of the second block of information that directly follows the entry point.

5. The method of claim 4, wherein the recording includes recording the bridging block of information on the record carrier.

6. The method of claim 1, wherein, after having inputted the "out" and "in" position for an edit point, the bridging block of information is generated in the background, whilst in parallel, the user is capable of determining the "out" and "in" position of a next edit point.

7. Edit apparatus tar editing a first ada second digital video information signal, where the second video information signal may be the same video information signal as the first video information signal, the first and second digital video information signal being recorded on a record carrier, the apparatus comprising:

means for reading a first block of information of the first digital information signal that is located around an edit point to be determined in the first digital information signal from the record carrier into an internal memory of the apparatus, wherein size of read blocks of the first digital information signal are within a predetermined range, means for outputting the first block of information from the apparatus, for display, means for establishing an "out" position in the first block of information as the edit point in the first digital video information signal, means for reading a second block of information of the second digital video information signal that is located around an edit point to be determined in the second digital video information signal from the record carrier into the internal memory of the apparatus, wherein size of read blocks of the second digital information signal are within the predetermined range, means for outputting the second block of information of the second digital video information signal from the apparatus, for display, means for establishing an "in" position in the second block of information as the edit point in the second digital video information signal, means for processing a portion of the first block of information that precedes and may include the "out" position, and a portion of the second block of information that follows and may include the "in" position to a composite block of information, such that the composite block of information has a resulting size within the predetermined range, means for outputting the composite block of information from the apparatus, for display, and means fix recording at least a portion of the composite block of information on the record carrier after the outputting for display.

8. A method of editing MPEG digital video information signals, comprising:

first reading blocks of information of a first digital MPEG information signal into an internal memory of editing apparatus, wherein size of read blocks of the first digital MPEG information signal are within a predetermined range;

first outputting the blocks of information of the fist digital MPEG information signal to an MPEG display;

first establishing an out position in a first block of information of the first digital MPEG information signal;

second reading blocks of information oh second digital MPEG information signal into the internal memory of the editing apparatus, wherein size of read blocks of the second digital MPEG information signal are within the predetermined range, second outputting the blocks of information of the second digital MPEG information signal to the MPEG display;

second establishing an in position in a second block of the blocks of information of the second digital MPEG information signal;

processing a portion of the first block of digital MPEG information that precedes and may include the out position, and a portion of the second block of digital MPEG information that follows and may include the in position, into a composite block of digital MPEG information, such that the composite block of digital MPEG information has a resulting size within the predetermined range;

outputting the composite block of digital MPEG information from the apparatus to the MPEG display; and recording at least a portion of the composite block of digital MPEG information that was displayed, onto a record carrier.

9. The method of claim 8, further comprising:

the method further comprises receiving a user input recording control signal after the outputting of the composite block of information to the MPEG display; and the recording depends on the recording control signal.

10. The method of claim 8, wherein:

the method further comprises receiving a user input reject control signal after the outputting of the composite block of information to the MPEG display; and the method further comprising repeating at least the first establishing, second establishing, processing, and outputting in response to the reject control signal.

11. The method of claim 8, wherein the processing includes:

determining an exit point earlier in the first block of information than the "out" position;

determining an entry point later in the second block of information than the "in" position; and creating a bridging block of information from the information in the first block of information between the exit point and the "out" position and from the information in the second block of information between the "in" position and the entry point, the composite block of information including a portion of the first block of information that directly precedes the exit point, the bridging block of information, and a portion of the second block of information that directly follows the entry point.

12. The method of claim 11, wherein the recording includes recording the bridging block of information on the record carrier.

13. The method of claim 8, wherein, the first and second establishing includes receiving user input and wherein after receiving user input for establishing the "out" and "in" position for an edit point, the bridging block of information Is generated in the background, whilst in parallel, the method is repeated for further editing.

14. The method of claim 8, in which the first digital MPEG information signals and the second digital MPEG information signal are different portions of the same digital MPEG information signal.

15. The method of claim 8 in which the record carrier is an optical recording disk.

16. The method of claim 8 in which die processing of the composite block provides seamless playing of the edited digital MPEG information.

17. The method of claim 8, wherein:

the method further comprises receiving a user input recording control signal after the outputting otto composite block of information to the display;

the recording depends on the recording control signal;

the method further comprises receiving a user input reject control signal after the outputting of the composite block of information to the display;

the method further composes repeating at least the first establishing, second establishing, processing, and third outputting in response to the direct control signal;

the processing includes: determining an exit point earlier in the first block of information than the "out" position; determining a entry point later in the second block of information than the "in" position; and creating a bridging block of information from the information in the first block of information between the exit point and the "out" position and from the information in the second block of information between the "in" position and the entry point, the composite block of information including a portion of the first block of information that directly precedes the exit point, the bridging block of information, and a portion of the second block of information that directly follows the entry point;

the recording includes recording the bridging block of information on the record carrier;

after receiving user input for establishing the "out" and "in" position for an edit point, the bridging block of information is generated in the background, whilst in parallel, the method is repeated for further editing;

the first digital MPEG information signals and the second digital MPEG information signal are different portions of the same digital MPEG information signal;

the record carrier is an optical recording disk;

the record carrier includes a data recording portion divided up into fixed size fragment areas; the processing means encodes the digital MPEG blocks to be recorded into a channel signal of sequential channel blocks;

the channel signal blocks include blocks with a size of 4MB;

the size of the channel signal blocks varics; and the processing of the composite block provides seamless playing of the edited digital MPEG information.

* * * * *